(12) United States Patent
Zhang et al.

(10) Patent No.: US 10,057,829 B2
(45) Date of Patent: Aug. 21, 2018

(54) VOWLAN CALL HANDOVER METHOD, UE AND CORE NETWORK NODE

(71) Applicant: Telefonaktiebolaget L M Ericsson (publ), Stockholm (SE)

(72) Inventors: HuaiShan Zhang, Beijing (CN); Tao Liu, Beijing (CN); Lin Dong, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 106 days.

(21) Appl. No.: 14/416,260

(22) PCT Filed: Dec. 24, 2014

(86) PCT No.: PCT/CN2014/094834
§ 371 (c)(1),
(2) Date: Jan. 21, 2015

(87) PCT Pub. No.: WO2016/101179
PCT Pub. Date: Jun. 30, 2016

(65) Prior Publication Data
US 2016/0192267 A1 Jun. 30, 2016

(51) Int. Cl.
*H04W 36/30* (2009.01)
*H04W 36/00* (2009.01)
(Continued)

(52) U.S. Cl.
CPC ....... *H04W 36/30* (2013.01); *H04W 36/0033* (2013.01); *H04W 36/14* (2013.01); *H04W 84/12* (2013.01)

(58) Field of Classification Search
CPC . H04W 36/0033; H04W 36/14; H04W 84/12; H04L 69/18
See application file for complete search history.

(56) References Cited

U.S. PATENT DOCUMENTS

| 2006/0045056 | A1 | 3/2006 | O'Hara, Jr. |
| 2007/0076664 | A1* | 4/2007 | An .................. H04W 80/10 370/331 |

(Continued)

FOREIGN PATENT DOCUMENTS

| CN | 1798427 A | 7/2006 |
| CN | 1898984 A | 1/2007 |

(Continued)

OTHER PUBLICATIONS

International Search Report and the Written Opinion of the International Searching Authority for Application No. PCT/CN2014/094834, dated Sep. 29, 2015, 12 pages.

(Continued)

*Primary Examiner* — Jackie Zuniga Abad
(74) *Attorney, Agent, or Firm* — Nicholson De Vos Webster & Elliott LLP

(57) ABSTRACT

The present disclosure relates to VoWLAN call handover solutions. In one embodiment the method comprising: making a voice call through a Wireless Local Area Network (WLAN) under whose coverage the UE is located, with a Packet Data Network (PDN) address obtained from a PDN to which the WLAN is connected; determining that a signal quality of the WLAN is not suitable for the voice call anymore; and sending the PDN address to a base station of a mobile communication network covering the UE, for facilitating a core network node of the mobile communication network to perform voice call handover from WLAN to the mobile communication network. The present disclosure also provides a UE and a core network node for implementing the same.

16 Claims, 8 Drawing Sheets

(51) Int. Cl.
   *H04W 84/12* (2009.01)
   *H04W 36/14* (2009.01)

(56) References Cited

U.S. PATENT DOCUMENTS

| | | | |
|---|---|---|---|
| 2008/0165764 A1 | 7/2008 | Mutikainen et al. | |
| 2010/0226339 A1 | 9/2010 | Stephenson et al. | |
| 2011/0261784 A1 | 10/2011 | Zeng et al. | |
| 2012/0094627 A1* | 4/2012 | Suh | H04W 4/22 455/404.1 |
| 2013/0155851 A1* | 6/2013 | Koodli | H04L 45/308 370/230 |
| 2013/0155948 A1* | 6/2013 | Pinheiro | H04W 4/005 370/328 |
| 2014/0293959 A1 | 10/2014 | Singh et al. | |

FOREIGN PATENT DOCUMENTS

| | | |
|---|---|---|
| CN | 101668280 A | 10/2010 |
| CN | 104168278 A | 11/2014 |

OTHER PUBLICATIONS

"3rd Generation Partnership Project; Technical Specification Group Core Network and Terminals; Non-Access-Stratum (NAS) protocol for Evolved Packet System (EPS); Stage 3 (Release 13)," 3GPP TS 24.301 V13.0.0, (Dec. 2014), pp. 1-374.

"3rd Generation Partnership Project; Technical Specification Group Core Network and Terminals; Technical realization of Cell Broadcast Service (CBS) (Release 13)," 3GPP TS 23.041 V13.0.0, (Dec. 2014), pp. 1-68.

International Preliminary Report on Patentability for Application No. PCT/CN2014/094834, dated Apr. 12, 2017, 49 pages.

3GPP TR 22.937 V12.0.0 (Oct. 2014), "Requirements for service continuity between mobile and Wireless Local Area Network (WLAN) networks," 3rd Generation Partnership Project; Technical Specification Group Services and System Aspects; (Release 12), Oct. 3, 2014, pp. 1-23.

Extended European Search Report for Application No. 14908747.0, dated Apr. 19, 2018, 13 pages.

* cited by examiner

VOWLAN CALL HANDOVER METHOD, UE AND CORE NETWORK NODE

CROSS-REFERENCE TO RELATED APPLICATIONS

This application is a National stage of International Application No. PCT/CN2014/094834, filed Dec. 24, 2014, which is hereby incorporated by reference.

TECHNICAL FIELD

The present disclosure generally relates to the technical field of wireless communications, and particularly to Voice over Wireless Local Area Network (WLAN) (VoWLAN) call handover solutions including both an inter-WLAN call handover and a call handover from a WLAN to a mobile communication network (e.g., a Long-Term Evolution (LTE) mobile communication network) (also called as a WLAN-LTE call handover for short in the present disclosure).

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

When a UE is in WLAN/Wi-Fi coverage and supports VoWLAN (also called as VoWi-Fi), the UE will obtain an Internet Protocol (IP) address from a Packet Data Network (PDN) (i.e., PDN address) and can use this PDN address to make a VoWi-Fi call.

Currently, a UE is always located under both WLAN/Wi-Fi coverage and mobile communication network coverage. For example, the mobile communication network can be a 2G ($2^{nd}$-Generation), 3G ($3^{rd}$-Generation), LTE or LTE-A (LTE-Advantage) network.

With the current technology, in a scenario where a VoWi-Fi call is going on but the UE is moving out of the WLAN/Wi-Fi coverage and finally cannot discover WLAN/Wi-Fi signal but is still under the mobile communication network coverage (e.g., LTE network coverage), the UE will try to establish a voice call over the LTE network (i.e., a VoLTE call). However, because no handover from WLAN/Wi-Fi to LTE network is available, the VoWi-Fi call is finally disconnected.

SUMMARY

In view of the foregoing, an object of the present disclosure is to overcome at least one of the above-described drawbacks of the existing approaches for facilitating VoWLAN call handover in either an inter-WLAN call handover scenario or a WLAN-LTE call handover scenario.

To achieve this object, according to a first aspect of the present disclosure, there is provided a method used in a UE for facilitating voice call handover. The method comprises: making a voice call through a WLAN under whose coverage the UE is located, with a PDN address obtained from a PDN to which the WLAN is connected; determining that a signal quality of the WLAN is not suitable for the voice call any more; and sending the PDN address to a base station of a mobile communication network covering the UE, for facilitating a core network node of the mobile communication network to perform voice call handover from WLAN to the mobile communication network.

In some embodiments, the signal quality of the WLAN can be determined not to be suitable for the voice call any more in at least one of the following conditions:
  a Bit Error Rate (BER) of signals of the WLAN is lower than a first predetermined threshold; or
  data of the voice call are not received from the WLAN for a predetermined time period; or
  a Received Signal Strength Indication (RSSI) of signals of the WLAN is lower than a second predetermined threshold.

In some embodiments, a PDN type can be sent to the base station together with the PDN address.

In some embodiments, before sending the PDN address to the base station, the method may further comprise: initiating a Radio Resource Control (RRC) connection procedure with the base station in response to determining that the UE has no RRC connection with the base station.

In some embodiments, after determining the signal quality of the WLAN is not suitable for the voice call any more, the method may further comprise: starting a PDN address sending timer. In this case, before the PDN address sending timer expires, the PDN address can be sent to the base station one or more times.

In some embodiments, the method may further comprise: after the PDN address sending timer expires, sending a message not containing the PDN address to the base station.

In some embodiments, the method may further comprise: receiving, from the base station, a response message indicating the UE is successfully attached to the mobile communication network and including a new PDN address assigned to the UE; and continuing the voice call through the mobile communication network with the new PDN address. In this case, it is to be noted that the new PDN address can be different from or identical to the PDN address.

In some embodiments, the core network node can be a Mobility Management Entity (MME) or a Serving GPRS Support Node (SGSN), the PDN address can be contained in an Attach Request message for the MME or SGSN, and the response message is Attach Accept message originating from the MME or SGSN.

According to a second aspect of the present disclosure, there is provided a UE for facilitating voice call handover. The UE comprises: a call processing unit configured to make a voice call through a WLAN under whose coverage the UE is located, with a PDN address obtained from a PDN to which the WLAN is connected; a signal detecting unit configured to determine that a signal quality of the WLAN is not suitable for the voice call any more; and a message sending unit configured to send the PDN address to a base station of a mobile communication network covering the UE, for facilitating a core network node of the mobile communication network to perform voice call handover from WLAN to the mobile communication network.

In some embodiments, the signal detecting unit can be configured to determine that the signal quality of the WLAN is not suitable for the voice call any more in at least one of the following conditions:
  a Bit Error Rate (BER) of signals of the WLAN is lower than a first predetermined threshold; or data of the voice call are not received from the WLAN for a predetermined time period; or a Received Signal Strength Indication (RSSI) of signals of the WLAN is lower than a second predetermined threshold.

In some embodiments, the message sending unit is further configured to send a PDN type to the base station together with the PDN address.

In some embodiments, the UE may further comprise a network connecting unit configured to, before the message sending unit sends the PDN address to the base station, initiate a RRC connection procedure with the base station in response to determining that the UE has no RRC connection with the base station.

In some embodiments, the UE may further comprise a PDN address sending timer (550) configured to be started after the signal detecting unit determines the signal quality of the WLAN is not suitable for the voice call any more. Optionally, the message sending unit can be further configured to send the PDN address to the base station one or more times before the PDN address sending timer expires. Or also as an option, the message sending unit can be further configured to send a message not containing the PDN address to the base station after the PDN address sending timer expires.

In some embodiments, the call processing unit can be further configured to receive, from the base station, a response message indicating the UE is successfully attached to the mobile communication network and including a new PDN address assigned to the UE, and continue the voice call through the mobile communication network with the new PDN address. Herein, the new PDN address can be different from or identical to the PDN address.

In some embodiments, the core network node is a Mobility Management Entity (MME) or a Serving GPRS Support Node (SGSN), the PDN address is contained in an Attach Request message for the MME or SGSN, and the response message is Attach Accept message originating from the MME or SGSN.

According to a third aspect of the present disclosure, there is provided a method used in a UE for facilitating inter-WLAN voice call handover. The method comprises: making a voice call through a WLAN under whose coverage the UE is located, with a PDN address obtained from a PDN to which the WLAN is connected; determining that a signal quality of the WLAN is not suitable for the voice call any more; initiating a connection procedure to an Access Point (AP) of another WLAN in response to determining that the other WLAN is available; and sending the PDN address to an evolved Packet Data Gateway (ePDG) of the other WLAN via the AP for facilitating the ePDG of the other WLAN to perform inter-WLAN voice call handover.

Similarly as the first aspect, in some embodiments, the signal quality of the WLAN can be determined not to be suitable for the voice call any more in at least one of the following conditions:

a Bit Error Rate (BER) of signals of the WLAN is lower than a first predetermined threshold; or data of the voice call are not received from the WLAN for a predetermined time period; or a Received Signal Strength Indication (RSSI) of signals of the WLAN is lower than a second predetermined threshold.

In some embodiments, a PDN type can be sent to the ePDG together with the PDN address.

In some embodiments, after determining the signal quality of the WLAN is not suitable for the voice call any more, the method may further comprise: starting a PDN address sending timer. In this case, before the PDN address sending timer expires, the PDN address can be sent to the ePDG one or more times.

In some embodiments, the method may further comprise: after the PDN address sending timer expires, sending a message not containing the PDN address to the ePDG of the other WLAN for making the ePDG of the other WLAN. In this case, the message not containing the PDN address can be a legacy IKE_Auth Initiator Request message.

In some embodiments, the method may further comprise: receiving, from the ePDG, a response message indicating the UE is successfully connected to the other WLAN and including a new PDN address assigned to the UE; and continuing the voice call through the other WLAN with the new PDN address. In this case, it is to be noted that the new PDN address can be different from or identical to the PDN address.

In some embodiments, the PDN address can be contained in an IKE_Auth Initiator Request message for the ePDG, and the response message can be an IKE_Auth Responser Response message.

According to a fourth aspect of the present disclosure, there is provided a UE for facilitating inter-WLAN voice call handover. The UE comprises: a call processing unit configured to make a voice call through a WLAN under whose coverage the UE is located, with a PDN address obtained from a PDN to which the WLAN is connected; a signal detecting unit configured to determine that a signal quality of the WLAN is not suitable for the voice call any more; a network connecting unit configured to initiate a connection procedure to an AP of another WLAN in response to determining that the other WLAN is available; and a message sending unit configured to send the PDN address to an evolved Packet Data Gateway (ePDG) of the other WLAN via the AP for facilitating the ePDG of the other WLAN to perform inter-WLAN voice call handover.

In some embodiments, the signal detecting unit can be configured to determine that the signal quality of the WLAN is not suitable for the voice call any more in at least one of the following conditions:

a Bit Error Rate (BER) of signals of the WLAN is lower than a first predetermined threshold; or data of the voice call are not received from the WLAN for a predetermined time period; or a Received Signal Strength Indication (RSSI) of signals of the WLAN is lower than a second predetermined threshold.

In some embodiments, the message sending unit can be further configured to send a PDN type to the ePDG together with the PDN address.

In some embodiments, the UE may further comprise a PDN address sending timer configured to be started after the signal detecting unit determines the signal quality of the WLAN is not suitable for the voice call any more. Optionally, the message sending unit can be further configured to send the PDN address to the ePDG one or more times before the PDN address sending timer expires. Or, also as an option, the message sending unit can be further configured to send a message not containing the PDN address to the ePDG of the other WLAN after the PDN address sending timer expires. In this case, the message not containing the PDN address can be a legacy IKE_Auth Initiator Request message.

In some embodiments, the call processing unit (720) can be further configured to receive, from the ePDG, a response message indicating the UE is successfully connected to the other WLAN and including a new PDN address assigned to the UE, and continue the voice call through the other WLAN with the new PDN address. Herein, the new PDN address can be different from or identical to the PDN address.

In some embodiments, the PDN address is contained in an IKE_Auth Initiator Request message for the ePDG, and the response message is an IKE_Auth Responser Response message.

According to a fifth aspect of the present disclosure, there is provided a method used in a core network node of a mobile communication network for performing voice call handover from a WLAN to the mobile communication network for a UE. The method comprises: receiving a request message for attachment originated from the UE; determining that the request message for attachment includes a PDN address of the UE, the PDN address being used by the UE in the WLAN for making a voice call through the WLAN; and performing voice call handover from WLAN to the mobile communication network, with the PDN address of the UE.

In some embodiments, the request message for attachment can be received from a base station covering the UE.

In some embodiments, the method may further comprises: determining that the request message for attachment does not include a PDN address of the UE; and performing a legacy attachment procedure for the UE without voice call handover from WLAN to the mobile communication network for the UE.

In some embodiments, the method may further comprises: sending, to the UE, a response message indicating the UE is successfully attached to the mobile communication network and including a new PDN address assigned to the UE; and sending data of the voice call to the UE through the mobile communication network with the new PDN address. In this case, it is to be noted that the new PDN address can be different from or identical to the PDN address.

In some embodiments, the core network node is a MME or a SGSN, the request message for attachment is an Attach Request message, and the response message is an Attach Accept message.

According to a sixth aspect of the present disclosure, there is provided a core network node of a mobile communication network for performing voice call handover from a WLAN to the mobile communication network for a UE. The core network node comprises: a PDN address detecting unit configured to receive a request message for attachment originated from the UE, and determine that the request message for attachment includes a PDN address of the UE, the PDN address being used by the UE in the WLAN for making a voice call through the WLAN; and a handover processing unit configured to perform voice call handover from WLAN to the mobile communication network, with the PDN address of the UE.

In some embodiments, the PDN address detecting unit can be configured to receive the request message for attachment from a base station covering the UE.

In some embodiments, the PDN address detecting unit can be further configured to determine that the request message for attachment does not include a PDN address of the UE. The core network node may further comprise an attachment processing unit configured to perform a legacy attachment procedure for the UE without voice call handover from WLAN to the mobile communication network for the UE.

In some embodiments, the handover processing unit can be further configured to send, to the UE, a response message indicating the UE is successfully attached to the mobile communication network and including a new PDN address assigned to the UE; and send data of the voice call to the UE through the mobile communication network with the new PDN address. Herein, the new PDN address can be different from or identical to the PDN address.

In some embodiments, the core network node is a Mobility Management Entity (MME) or a Serving GPRS Support Node (SGSN), the request message for attachment is an Attach Request message, and the response message is an Attach Accept message.

With the proposed VoWLAN call handover method and UE, the successful rate for VoWLAN call handover either to a mobile communication network or to another WLAN can be increased.

BRIEF DESCRIPTION OF THE DRAWINGS

The above and other objects, features, and advantages of the present disclosure will become apparent from the following descriptions on embodiments of the present disclosure with reference to the drawings, in which.

Figure 1:
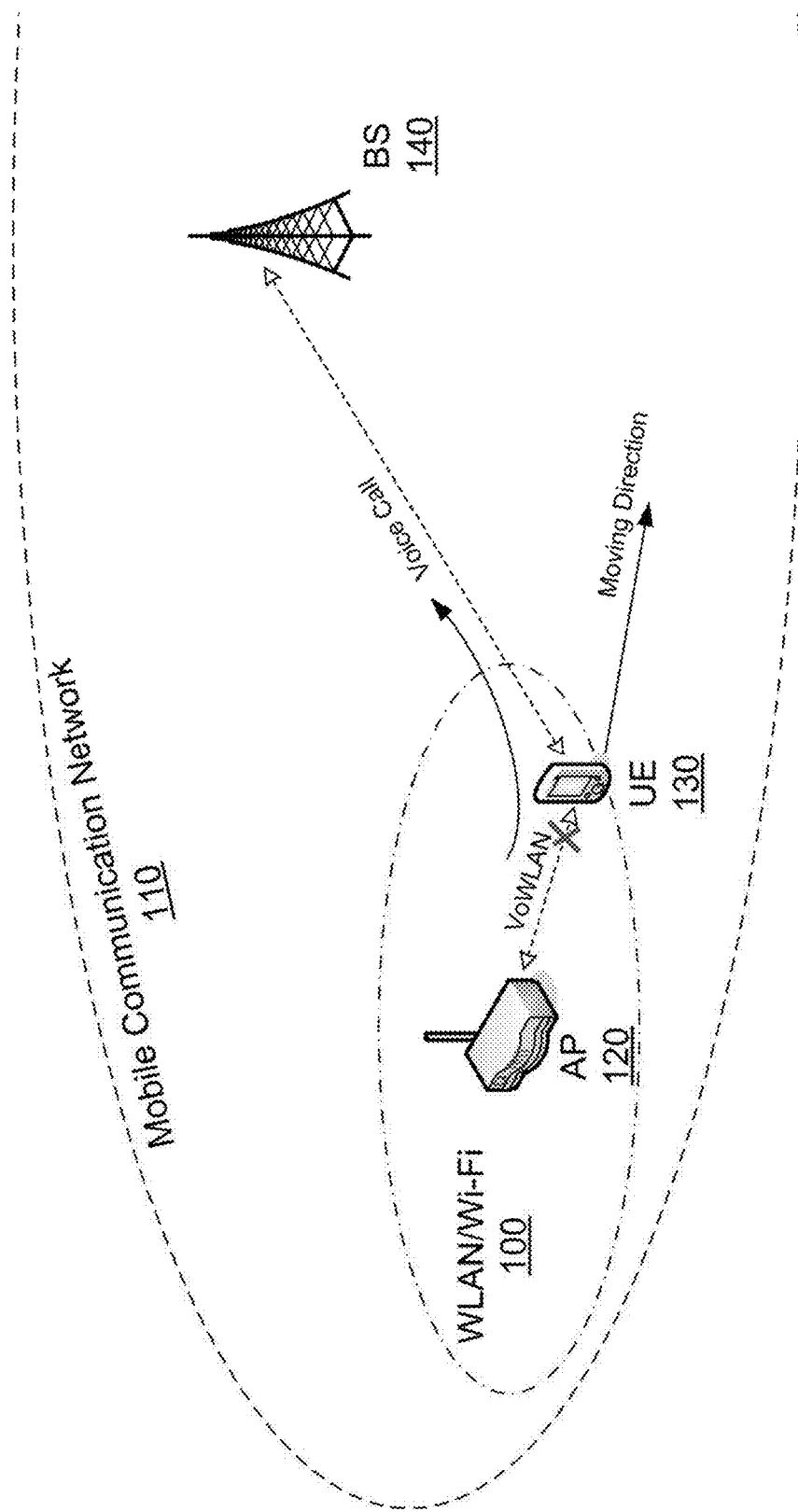
FIG. 1 is a systematic diagram showing a WLAN-LTE call handover scenario according to some embodiments of the present disclosure.

In the drawings, similar or same steps and/or elements are designated with similar or same referential numbers. It is to be noted that not all the steps and/or elements shown in the drawings are necessary for some embodiments of the present disclosure. For simplicity and clarity, those optional steps and/or elements are shown in dashed lines.

DETAILED DESCRIPTION OF EMBODIMENTS

In the discussion that follows, specific details of particular embodiments of the present techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail.

Those skilled in the art will appreciate that the functions described may be implemented in one or in several nodes.

Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the presently disclosed techniques may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Since various wireless systems may benefit from exploiting the ideas covered within this disclosure as will be appreciated by those skilled in the art, terms like "base station", "user equipment", "access point" and "core network node" as used herein should be understood in a broad sense. Specifically, the base station should be understood to encompass a legacy base station in a $2^{nd}$ Generation (2G) network, a NodeB in a $3^{rd}$ Generation (3G) network, an evolved NodeB (eNode B) in a $4^{th}$ Generation (4G) or future evolved network (e.g., LTE network, LTE-A network etc.), and the like. The user equipment should be understood to encompass a mobile telephone, a smartphone, a wireless-enabled tablet or personal computer, a wireless machine-to-machine unit, and the like. The access point should be understood to encompass a wireless switch, a wireless router, a wireless hub, a wireless bridge, or any device capable of being used in a wireless local area network for accessing functionalities, and the like. The core network node should be understood to encompass a Mobility Management Entity (MME), a Serving GPRS Support Node (SGSN), and the like.

In the following, the embodiments of the present disclosure will be described in detail with UE, eNode B, MME, ePDG as the examples. However, as declared above, the present disclosure is not limited thereto. In addition, the nomination "WLAN-LTE call handover" is used herein for representing a call handover from a WLAN to a mobile communication network instead of only a call handover from a WLAN to a LTE network.

WLAN-LTE Call Handover

FIG. 1 is a systematic diagram showing a WLAN-LTE call handover scenario according to some embodiments of the present disclosure.

Starting from FIG. 1, UE 130 is located under both coverage of a WLAN/Wi-Fi network 100 and coverage of a mobile communication network 110. The WLAN/Wi-Fi network 100 has an AP 120 used for all the terminals within its coverage. The mobile communication network 110 has a base station (BS) (eNode B) 140 used for all the terminals within its coverage. However, the present disclosure is also applicable to a scenario where one or more APs and/or one or more BSs are involved. The WLAN/Wi-Fi network 100 and the BS 140 are both connected to a PDN (core network) (not shown for clarity). When UE 130 is connected to the WLAN/Wi-Fi network 100, the PDN will assign a PDN address to the UE 130 to identify the UE 130 within the PDN network domain. As shown in FIG. 1, UE 130 can make a voice call through AP 120 with this assigned PDN address (a VoWLAN or VoWi-Fi call). When UE 130 moves inside the WLAN/Wi-Fi network 100, this VoWLAN call can be kept continuously. However, when UE 130 is moving out of the WLAN/Wi-Fi network 100 (as shown in FIG. 1 with an arrow "moving direction") and finally approaching the edge of the WLAN/Wi-Fi network 100, this VoWLAN call cannot be kept due to degraded WLAN signals and this VoWLAN call needs to be handed over to BS 140 to initiate a VoLTE call to enhance the user's experiences without disconnecting the voice call.

The detailed operations of the WLAN-LTE call handover solutions of the present disclosure will be described in conjunction with FIG. 2, which is a sequential diagram showing WLAN-LTE call handover solutions according to some embodiments of the present disclosure.

Figure 2:
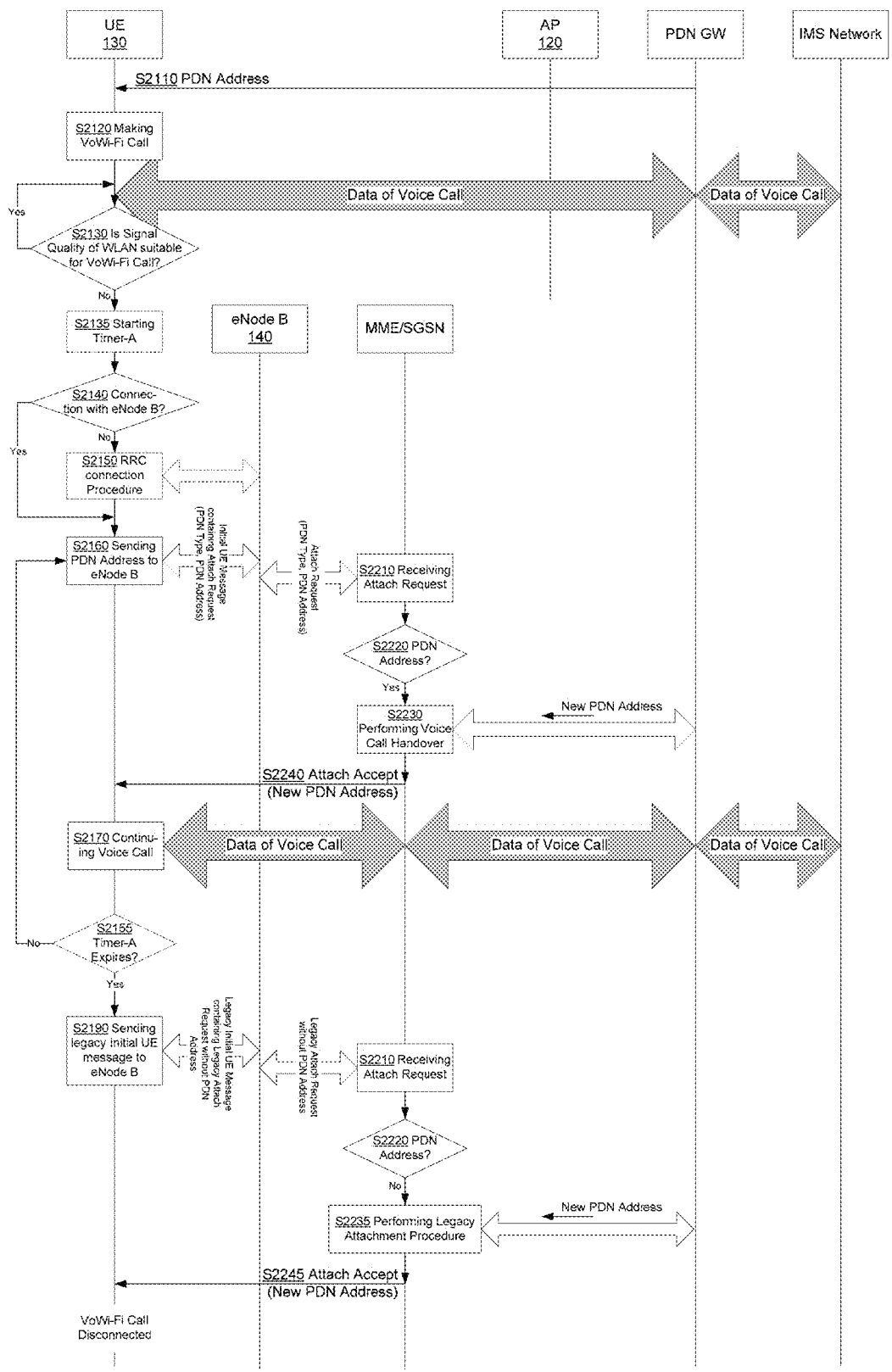
FIG. 2 is a sequential diagram showing WLAN-LTE call handover solutions according to some embodiments of the present disclosure.

In FIG. 2, when UE 130 is connected to the WLAN/Wi-Fi network 100, the PDN will assign a PDN address to the UE 130 to identify the UE 130 within the PDN network domain (Step S2110). With this assigned PDN address, UE 130 can make a voice call through the WLAN/Wi-Fi network 100 (a VoWLAN or VoWi-Fi call) (Step S2120). During the voice call, UE 130 will detect whether a signal quality of the WLAN 100 is not suitable for the voice call any more (Step S2130). This detection can be periodically. If UE 130 determines that the signal quality of the WLAN 100 can support the voice call in good quality (Step S2130: Yes), the UE 130 takes no actions and waits for next detection interval. On the other hand, if UE 130 determines that the signal quality of the WLAN 100 is not suitable for the voice call any more (Step S2130: No), UE 130 goes to Step S2160 to send the PDN address of its own to BS 140 for facilitating MME/SGSN of the mobile communication network 110 to perform WLAN-LTE call handover.

In Step S2130, the signal quality of the WLAN can be determined as not to be suitable for the voice call any more in at least one of the following conditions:
 a Bit Error Rate (BER) of signals of the WLAN 100 is lower than a first predetermined threshold; or
 data of the voice call are not received from the WLAN 100 for a predetermined time period (for example, 200 milliseconds, 300 milliseconds or the like); or
 a Received Signal Strength Indication (RSSI) of signals of the WLAN 100 is lower than a second predetermined threshold (for example, −90 dBm, −100 dBm or the like).

After Step S2130, UE 130 may optionally start a PDN address sending timer (Step S2135). Before the PDN address sending timer expires (Step S2155: No), UE 130 can send the PDN address to the BS 140 one or more times. On the other hand, after the PDN address sending timer expires (S2155: Yes), UE 130 will send a message not containing the PDN address to the BS 140 (S2190) (for example, a legacy Initial UE message). The PDN address sending timer may count a predetermined time period (for example, 2 seconds, 5 seconds, 10 seconds or the like) which can be adjusted according to system configurations.

Also optionally, before Step S2160, UE 130 may determine whether it has RRC connection with the BS 140 (Step S2140). If UE 130 has RRC connection with the BS 140 (S2140: Yes), UE 130 goes to Step S2160. Otherwise, if UE 130 has no RRC connection with the BS 140 (S2140: No), UE 130 initiates an RRC connection procedure with the BS 140 (Step S2150).

In Step S2160, UE 130 can also send a PDN type together with the PDN address to BS 140. For example, UE 130 may send an Initial UE message to eNode B 140. The Initial UE message contains an Attach Request message to MME/SGSN. UE 130 will include the PDN address and/or the PDN type in the Attach Request message. BS 140 will forward the Attach Request contained in the Initial UE message to the MME/SGSN.

Thereafter, at the MME/SGSN side, MME/SGSN receives the Attach Request originated from UE 130 at Step S2210. In Step S2220, MME/SGSN determines whether the Attach Request includes a PDN address of UE 130. If so (S2220: Yes), MME/SGSN goes to Step S2230 to perform WLAN-LTE call handover procedure with the PDN address of the UE 130. In details, MME/SGSN will notify PDN Gateway (GW) the PDN address of the UE 130 to inform the PDN GW that UE 130 moves into its coverage. PDN GW will acknowledge the UE 130's handover and will assign a new PDN address to the UE 130 (the new PDN address can be different from or identical to the PDN address of UE 130 obtained in the WLAN 100). PDN GW then sends the new PDN address of the UE 130 to the MME/SGSN and begins to route data of the on-going voice call addressed to UE 130 to MME/SGSN. In turn, MME/SGSN sends an Attach Accept message containing the new PDN address to the UE 130 to confirm the successful handover of UE 130 from WLAN 100 to mobile communication network 110 (Step S2240). Then, MME/SGSN will send data of the voice call to the UE 130 with the new PDN address.

Back to the UE 130 side, with MME/SGSN's step S2240, UE 130 receives the Attach Accept message and knows now it has been successfully attached to the mobile communication network 110. UE 130 also obtains its new PDN address from the Attach Accept message, and will continue the voice call through the mobile communication network 110 with the new PDN address at Step S2170. As explained before, the new PDN address can be different from or identical to the PDN address of UE 130 obtained in the WLAN 100.

On the other hand, responsive to Step S2190, MME/SGSN determines that the Attach Request does not include a PDN address of UE 130 (S2220: No), and then MME/SGSN goes to Step S2235 to performing a legacy attachment procedure with the PDN GW. PDN GW will acknowledge the UE 130's attachment and will assign a new PDN address to the UE 130. PDN GW then sends the new PDN address of the UE 130 to the MME/SGSN. In turn, MME/SGSN sends an Attach Accept message containing the new PDN address to the UE 130 to confirm the successful attachment of UE 130 to mobile communication network 110 (Step S2245). Because the call handover is not completed with the time limit set by the PDN address sending timer, VoWi-Fi call is disconnected.

Inter-WLAN Call Handover

Figure 3:
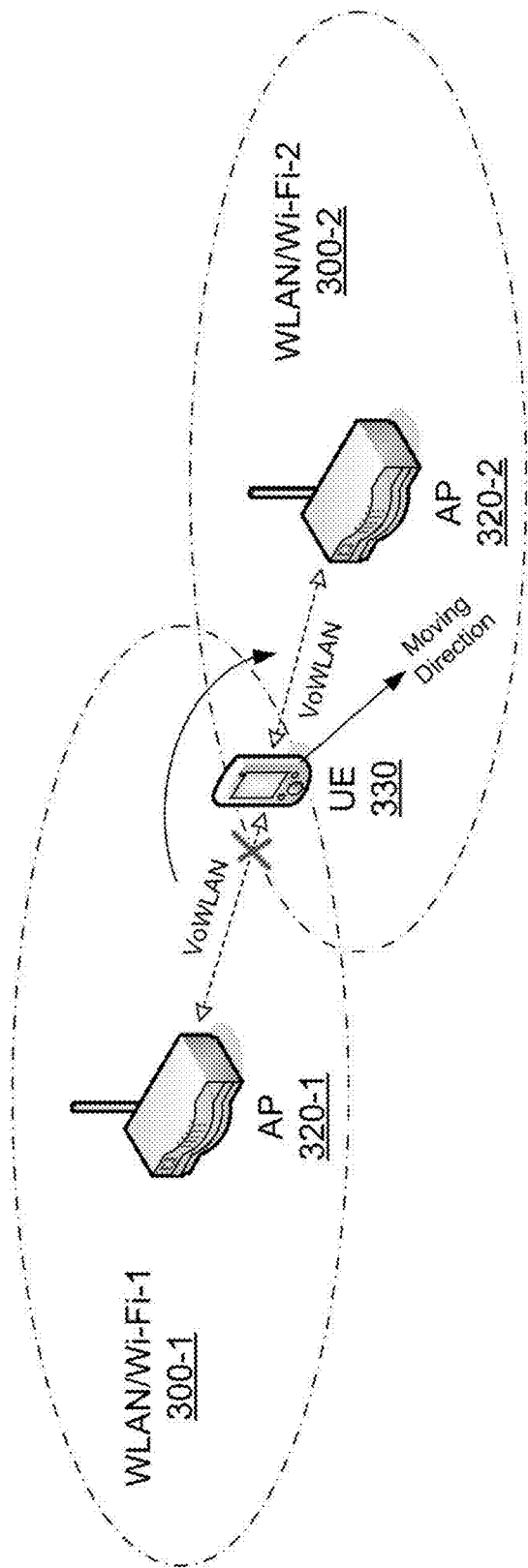
FIG. 3 is a systematic diagram showing an inter-WLAN call handover scenario according to some embodiments of the present disclosure.

FIG. 3 is a systematic diagram showing an inter-WLAN call handover scenario according to some embodiments of the present disclosure.

Starting from FIG. 3, there are two WLAN/Wi-Fi network-1 300-1 and WLAN/Wi-Fi network-2 300-2. WLAN networks 300-1 and 300-2 have their respective AP 320-1 and AP 320-2 used for all the terminals within their respective coverage. The present disclosure is also applicable to a scenario where one or more APs are involved in one WLAN network. WLAN networks 300-1 and 300-2 are both connected to a PDN (core network) (not shown for clarity). UE 330 is located under coverage of the WLAN/Wi-Fi network 300-1. When UE 330 is connected to the WLAN/Wi-Fi network 300-1, the PDN will assign a PDN address to the UE 330 to identify the UE 330 within the PDN network domain. As shown in FIG. 3, UE 330 can make a voice call through AP 320-1 with this assigned PDN address (a VoWLAN or VoWi-Fi call). When UE 330 moves inside the WLAN/Wi-Fi network 300-1, this VoWLAN call can be kept continuously. However, when UE 330 is moving out of the WLAN/Wi-Fi network 300-1 (as shown in FIG. 3 with an arrow "moving direction") and finally approaching the edge of the WLAN/Wi-Fi network 300-1, this VoWLAN call cannot be kept due to degraded WLAN signals and this VoWLAN call needs to be handed over to AP 320-2 to initiate another VoWLAN call to enhance the user's experiences without disconnecting the voice call.

The detailed operations of the inter-WLAN call handover solutions of the present disclosure will be described in conjunction with FIG. 4, which is a sequential diagram showing inter-WLAN call handover solutions according to some embodiments of the present disclosure.

Figure 4:
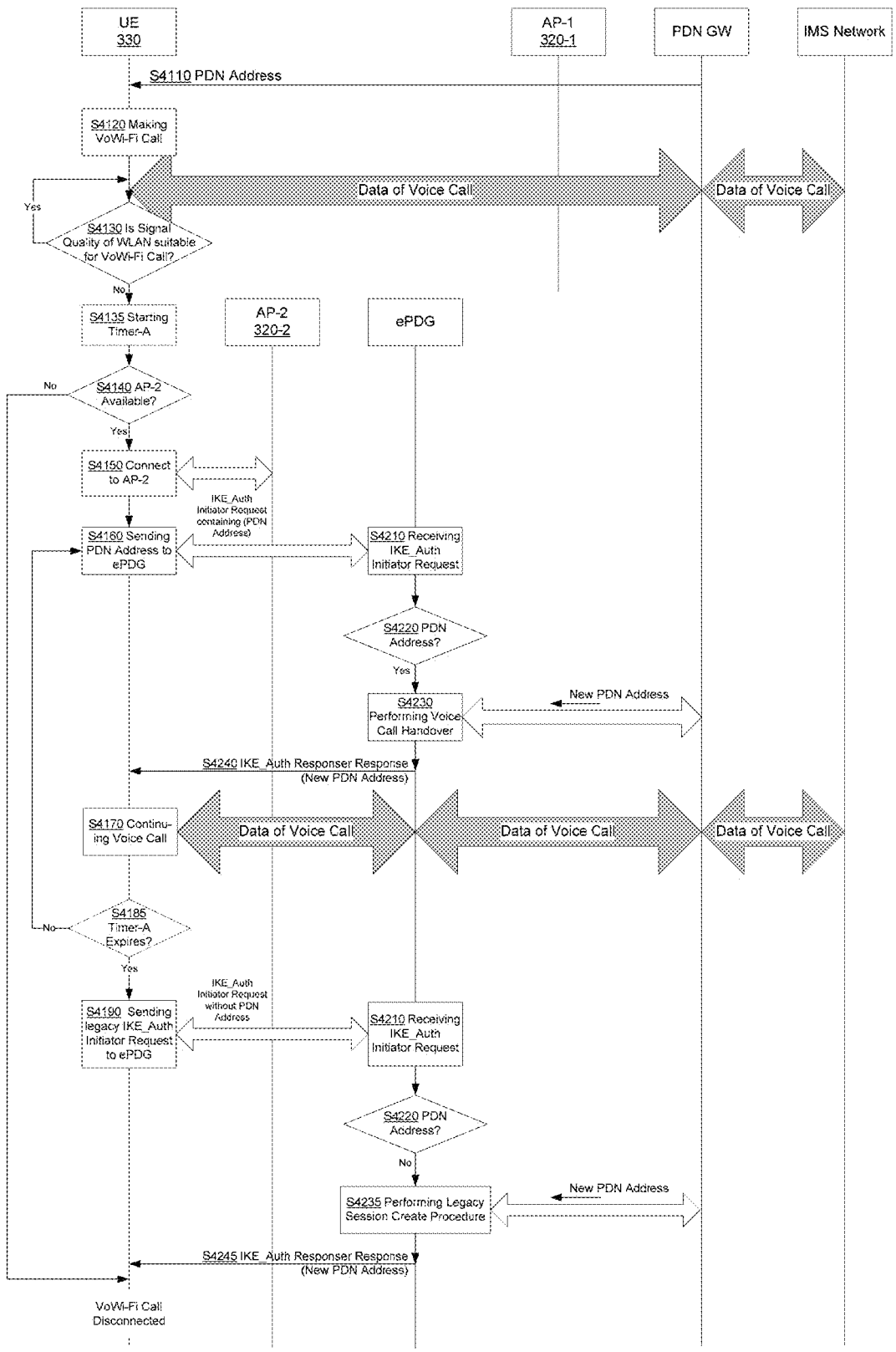
FIG. 4 is a sequential diagram showing inter-WLAN call handover solutions according to some embodiments of the present disclosure.

In FIG. 4, when UE 330 is connected to the WLAN/Wi-Fi network 300-1, the PDN will assign a PDN address to the UE 330 to identify the UE 330 within the PDN network domain (Step S4110). With this assigned PDN address, UE 330 can make a voice call through the WLAN/Wi-Fi network 300-1 (a VoWLAN or VoWi-Fi call) (Step S4120). During the voice call, UE 330 will detect whether a signal quality of the WLAN 300-1 is not suitable for the voice call any more (Step S4130). This detection can be periodically. If UE 330 determines that the signal quality of the WLAN 300-1 can support the voice call in good quality (Step S4130: Yes), the UE 330 takes no actions and waits for next detection interval. On the other hand, if UE 330 determines that the signal quality of the WLAN 300-1 is not suitable for the voice call any more (Step S4130: No), UE 330 goes to Step S4140 to determine whether WLAN 300-2 is available or not. If WLAN 300-2 is available (S4140: Yes), UE 330 initiates a connection procedure to AP 320-2 of WLAN 300-2 (Step S4150). After being connected to AP 320-2, UE 330 sends the PDN address of its own to ePDG of the WLAN/Wi-Fi network 300-2 (Step S4160) for facilitating ePDG to perform inter-WLAN call handover.

Similarly to Step S2130, in Step S4130, the signal quality of the WLAN 300-1 can be determined as not to be suitable for the voice call any more in at least one of the following conditions:

a Bit Error Rate (BER) of signals of the WLAN 300-1 is lower than a first predetermined threshold; or data of the voice call are not received from the WLAN 300-1 for a predetermined time period (for example, 200 milliseconds, 300 milliseconds or the like); or a Received Signal Strength Indication (RSSI) of signals of the WLAN 300-1 is lower than a second predetermined threshold (for example, −90 dBm, −100 dBm or the like).

In Step S4140, the availability of WLAN 300-2 can be determined if:

a Received Signal Strength Indication (RSSI) of signals of the WLAN 300-2 is higher than a third predetermined threshold (for example, −80 dBm, −90 dBm or the like).

After Step S4130, UE 330 may optionally start a PDN address sending timer (Step S4135). Before the PDN address sending timer expires (Step S4185: No), UE 330 can send the PDN address to the ePDG one or more times. On the other hand, after the PDN address sending timer expires (S4185: Yes), UE 330 will send a message not containing the PDN address to the ePDG (S4190) (for example, a legacy IKE_Auth Initiator Request message). The PDN address sending timer may count a predetermined time period (for example, 2 seconds, 5 seconds, 10 seconds or the like) which can be adjusted according to system configurations.

In Step S4160, UE 330 can also send a PDN type together with the PDN address to ePDG. For example, UE 330 may send an IKE_Auth Initiator Request message to ePDG. UE 330 will include the PDN address and/or the PDN type in the IKE_Auth Initiator Request message.

Thereafter, at the ePDG side, ePDG of the WLAN/Wi-Fi network 300-2 receives the IKE_Auth Initiator Request message from UE 330 at Step S4210. In Step S4220, ePDG determines whether the IKE_Auth Initiator Request message includes a PDN address of UE 330. If so (S4220: Yes), ePDG goes to Step S4230 to perform inter-WLAN call handover procedure with the PDN address of the UE 330. In details, ePDG will notify PDN Gateway (GW) the PDN address of the UE 330 to inform the PDN GW that UE 330 moves into its coverage. PDN GW will acknowledge the UE 330's handover and will assign a new PDN address to the UE 330 (the new PDN address can be different from or identical to the PDN address of UE 330 obtained in the WLAN 300-1). PDN GW then sends the new PDN address of the UE 330 to the ePDG and begins to route data of the on-going voice call addressed to UE 330 to ePDG. In turn, ePDG sends an IKE_Auth Responser Response message containing the new PDN address to the UE 330 to confirm the successful handover of UE 330 from WLAN 300-1 to WLAN 300-2 (Step S4240). Then, ePDG will send data of the voice call to the UE 330 with the new PDN address.

Back to the UE 330 side, with ePDG's step S4240, UE 330 receives the IKE_Auth Responser Response message and knows now it has been successfully connected to the WLAN 300-2. UE 330 also obtains its new PDN address from the IKE_Auth Responser Response message, and will continue the voice call through the WLAN 300-2 with the new PDN address at Step S4170. As explained before, the new PDN address can be different from or identical to the PDN address of UE 330 obtained in the WLAN 300-1.

On the other hand, responsive to Step S4190, ePDG of the WLAN/Wi-Fi network 300-2 determines that the IKE_Auth Initiator Request message does not include a PDN address of UE 330 (S4220: No), and then ePDG goes to Step S4235 to performing a legacy Session Create procedure with the PDN GW. PDN GW will acknowledge the UE 330's connection and will assign a new PDN address to the UE 330. PDN GW then sends the new PDN address of the UE 330 to the ePDG. In turn, ePDG sends an IKE_Auth Responser Response message containing the new PDN address to the UE 330 to confirm the successful connection of UE 330 to the WLAN 300-2 (Step S4245). Because the call handover is not completed with the time limit set by the PDN address sending timer, VoWi-Fi call is disconnected.

Back to the "No" branch of Step S4140, because no any other WLAN is available, VoWi-Fi call is disconnected.

Apparatuses for WLAN-LTE Call Handover

Figure 5:
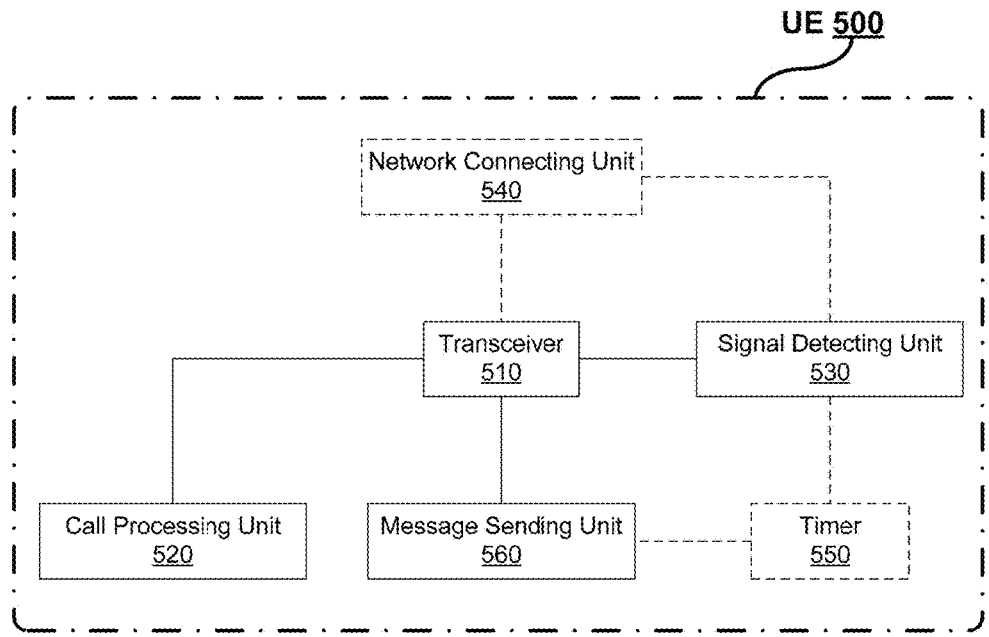
FIG. 5 is a block diagram showing a UE 500 for implementing WLAN-LTE call handover solutions according to some embodiments of the present disclosure.

FIG. 5 is a block diagram showing a UE 500 for implementing WLAN-LTE call handover solutions according to some embodiments of the present disclosure.

The UE 500 includes a transceiver 510, a call processing unit 520, a signal detecting unit 530, and a message sending unit 560. In some embodiments, UE 500 may optionally include a network connecting unit 540 and/or a PDN address sending timer 550. For example, UE 500 can be used as UE 130 in FIG. 1.

The transceiver 510 is used to communicate with AP 120 and/or BS 140. The transceiver 510 is connected to the call processing unit 520, the signal detecting unit 530, and the message sending unit 560, and the optional network connecting unit 540. All communications from these units 520, 530, 560 and 540 will be conducted via the transceiver 510.

The call processing unit 520 is used to make a voice call through a WLAN 100 under whose coverage the UE 500 is located, with a PDN address obtained from a PDN to which the WLAN 100 is connected.

The signal detecting unit 530 is used to determine that a signal quality of the WLAN 100 is not suitable for the voice call any more. For example, the signal detecting unit 530 can determine that the signal quality of the WLAN 100 is not suitable for the voice call any more in at least one of the following conditions:

a Bit Error Rate (BER) of signals of the WLAN 100 is lower than a first predetermined threshold; or data of the voice call are not received from the WLAN 100 for a predetermined time period (for example, 200 milliseconds, 300 milliseconds or the like); or a Received Signal Strength Indication (RSSI) of signals of the WLAN 100 is lower than a second predetermined threshold (for example, −90 dBm, −100 dBm or the like).

The message sending unit 560 is used to send the PDN address to a BS 140 of a mobile communication network 110 covering the UE 500, for facilitating a core network node (e.g., MME/SGSN) of the mobile communication network 110 to perform voice call handover from WLAN 100 to the mobile communication network 110.

The message sending unit 560 can further send a PDN type to the BS 140 together with the PDN address.

The optional network connecting unit 540 can be used to determine whether the UE 500 has a Radio Resource Control (RRC) connection with the BS 140 before the message sending unit 560 sends the PDN address to the BS 140. If no, the network connecting unit 540 initiates an RRC connection procedure with the base station. On the other hand, if the UE 500 has already had a Radio Resource Control (RRC) connection with the BS 140, the network connecting unit 540 will not perform any operations.

The optional PDN address sending timer 550 can be connected to the signal detecting unit 530 and the message sending unit 560. The PDN address sending timer 550 can be started after the signal detecting unit 530 determines the signal quality of the WLAN 100 is not suitable for the voice call any more. The message sending unit 560 can send the PDN address to the BS 140 one or more times before the PDN address sending timer 550 expires, and/or the message sending unit 560 can send a message not containing the PDN address to the BS 140 after the PDN address sending timer 550 expires. The PDN address sending timer 550 may count a predetermined time period (for example, 2 seconds, 5 seconds, 10 seconds or the like) which can be adjusted according to system configurations.

The call processing unit 520 can be further used to receive, from the BS 140, a response message indicating the UE 500 is successfully attached to the mobile communication network 110 and including a new PDN address assigned to the UE 500, and then continue the voice call through the mobile communication network 110 with the new PDN address. Herein, the new PDN address can be different from or identical to the PDN address of UE 500 obtained in the WLAN 100.

The core network node can be a MME or a SGSN, the PDN address can be contained in an Attach Request message for the MME or SGSN, and the response message is Attach Accept message originating from the MME or SGSN.

Figure 6:
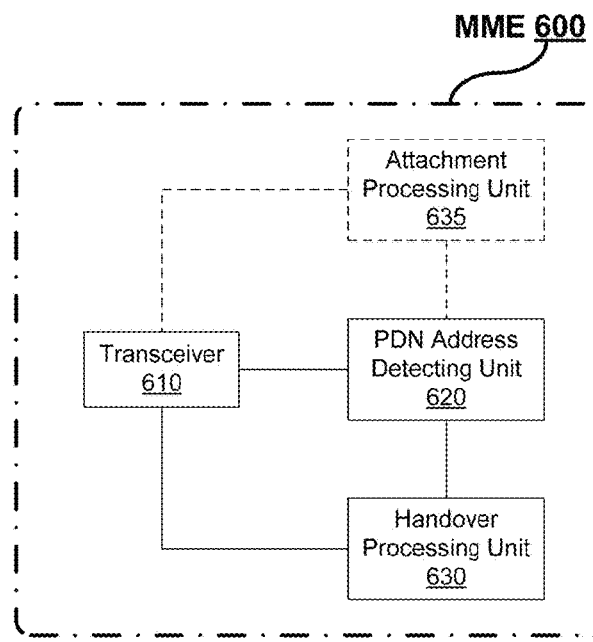
FIG. 6 is a block diagram showing a MME 600 for implementing WLAN-LTE call handover solutions according to some embodiments of the present disclosure.

FIG. 6 is a block diagram showing a MME 600 for implementing WLAN-LTE call handover solutions according to some embodiments of the present disclosure;

As explained before, MME 600 is used as one non-limited example of core network node.

The MME 600 includes a transceiver 610, a PDN address detecting unit 620, and a handover processing unit 630. In some embodiments, MME 600 may optionally include an attachment processing unit 635.

The transceiver 610 is used to communicate with UE 130 (e.g., UE 500) via BS 140 and/or PDN GW. The transceiver 610 is connected to the PDN address detecting unit 620, and the handover processing unit 630, and the optional attachment processing unit 635.

The PDN address detecting unit 620 is used to receive a request message for attachment (e.g., Attach Request message) originated from the UE 130, and determine that the Attach Request message includes a PDN address of the UE 130, the PDN address being used by the UE 130 in the WLAN 100 for making a voice call through the WLAN 100.

The handover processing unit 630 is used to perform voice call handover from WLAN 100 to the mobile communication network 110, with the PDN address of the UE 130. In details, the handover processing unit 630 will notify PDN GW the PDN address of the UE 130 to inform the PDN GW that UE 130 moves into MME 600's coverage. PDN GW will acknowledge the UE 130's handover and will assign a new PDN address to the UE 130 (the new PDN address can be different from or identical to the PDN address of UE 130 obtained in the WLAN 100). PDN GW then sends the new PDN address of the UE 130 to the handover processing unit 630 and begins to route data of the on-going voice call addressed to UE 130 to MME 600.

The PDN address detecting unit 620 can receive the Attach Request message from BS 140 covering the UE 130. For example, UE 130 may send an Initial UE message to eNode B 140. The Initial UE message contains an Attach Request message to MME 600. UE 130 will include the PDN address and/or the PDN type in the Attach Request message. BS 140 will forward the Attach Request contained in the Initial UE message to the MME 600.

The PDN address detecting unit 620 can also determine that the request message for attachment does not include a PDN address of the UE. In this case, the attachment processing unit 635 performs a legacy attachment procedure for the UE 130 without voice call handover from WLAN 100 to the mobile communication network 100 for the UE 130.

According to PDN GW's acknowledgement, the handover processing unit 630 sends to the UE 130 a response message (e.g., Attach Accept message) indicating the UE 130 is successfully attached to the mobile communication network 110 and including a new PDN address assigned to the UE 130 and then sends data of the voice call to the UE 130 through the mobile communication network 110 with the new PDN address. In this case, the new PDN address is different from or identical to the PDN address of UE 130 obtained in WLAN 100.

Apparatuses for Inter-WLAN Call Handover

Figure 7:
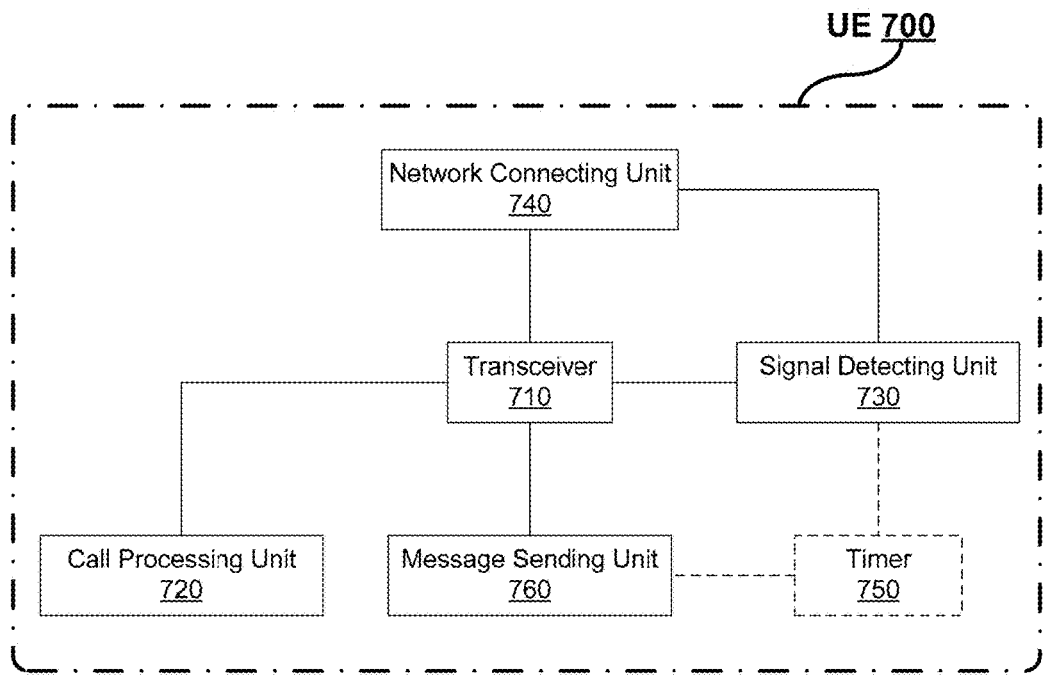
FIG. 7 is a block diagram showing a UE 700 for implementing WLAN-LTE call handover solutions according to some embodiments of the present disclosure.

FIG. 7 is a block diagram showing a UE 700 for implementing WLAN-LTE call handover solutions according to some embodiments of the present disclosure.

The UE 700 includes a transceiver 710, a call processing unit 720, a signal detecting unit 730, a network connecting unit 740, and a message sending unit 760. In some embodiments, UE 700 may optionally include a PDN address sending timer 770. For example, UE 700 can be used as UE 330 in FIG. 3.

The transceiver 710 is used to communicate with AP 320-1 and/or AP 320-2. The transceiver 710 is connected to the call processing unit 720, the signal detecting unit 730, the network connecting unit 740 and the message sending unit 760. All communications from these units 720, 730, 740 and 760 will be conducted via the transceiver 710.

The call processing unit 720 is used to make a voice call through a WLAN 100 under whose coverage the UE 700 is located, with a PDN address obtained from a PDN to which the WLAN 300-1 is connected.

The signal detecting unit 730 is used to determine that a signal quality of the WLAN 100 is not suitable for the voice call any more. For example, the signal detecting unit 730 can determine that the signal quality of the WLAN 300-1 is not suitable for the voice call any more in at least one of the following conditions:

a Bit Error Rate (BER) of signals of the WLAN 300-1 is lower than a first predetermined threshold; or data of the voice call are not received from the WLAN 300-1 for a predetermined time period (for example, 200 milliseconds, 300 milliseconds or the like); or a Received Signal Strength Indication (RSSI) of signals of the WLAN 300-1 is lower than a second predetermined threshold (for example, −90 dBm, −100 dBm or the like).

The network connecting unit 740 is be used to determine whether WLAN 300-2 is available, and when the WLAN 300-2 is available, initiate a connection procedure to AP 320-2 of WLAN 300-2. Herein, the availability of WLAN 300-2 can be determined if:

a Received Signal Strength Indication (RSSI) of signals of the WLAN 300-2 is higher than a third predetermined threshold (for example, −80 dBm, −90 dBm or the like).

If the network connecting unit 740 determines no any other WLAN is available, VoWi-Fi call is disconnected.

The message sending unit 760 is used to send the PDN address to ePDG of WLAN 300-2, for facilitating ePDG of WLAN 300-2 to perform inter-WLAN voice call handover.

The message sending unit 760 can further send a PDN type to the ePDG together with the PDN address.

The optional PDN address sending timer 750 can be connected to the signal detecting unit 730 and the message sending unit 760. The PDN address sending timer 750 can be started after the signal detecting unit 730 determines the signal quality of the WLAN 300-1 is not suitable for the voice call any more. The message sending unit 760 can send the PDN address to the ePDG of WLAN 300-2 one or more times before the PDN address sending timer 750 expires, and/or the message sending unit 760 can send a message not containing the PDN address to the ePDG of WLAN 300-2 after the PDN address sending timer 750 expires. The PDN address sending timer 750 may count a predetermined time period (for example, 2 seconds, 5 seconds, 10 seconds or the like) which can be adjusted according to system configurations.

The call processing unit 720 can be further used to receive, from the ePDG of WLAN 300-2, a response message indicating the UE 700 is successfully attached to WLAN 300-2 and including a new PDN address assigned to the UE 700, and then continue the voice call through WLAN 300-2 with the new PDN address. Herein, the new PDN address can be different from or identical to the PDN address of UE 700 obtained in the WLAN 300-1.

The PDN address can be contained in an an IKE_Auth Initiator Request message for the ePDG, and the response message can be an IKE_Auth Responser Response message.

Figure 8:
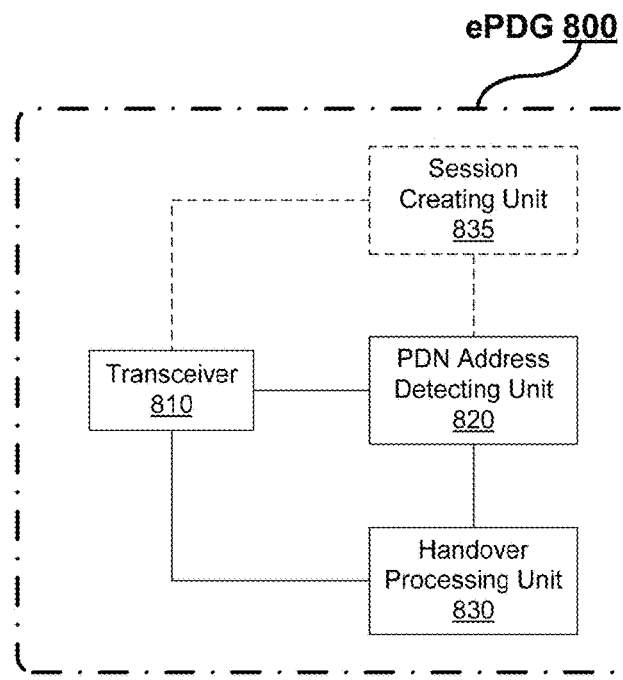
FIG. 8 is a block diagram showing an ePDG 800 for implementing WLAN-LTE call handover solutions according to some embodiments of the present disclosure.

FIG. 8 is a block diagram showing an ePDG 800 for implementing WLAN-LTE call handover solutions according to some embodiments of the present disclosure.

The ePDG 800 includes a transceiver 810, a PDN address detecting unit 820, and a handover processing unit 830. In some embodiments, ePDG 800 may optionally include a session creating unit 835.

The transceiver 810 is used to communicate with UE 330 via AP 320-2 and/or PDN GW. The transceiver 810 is connected to the PDN address detecting unit 820, and the handover processing unit 830, and the optional session creating unit 835.

The PDN address detecting unit 820 is used to receive a request message for connection (e.g., IKE_Auth Initiator Request message) from the UE 330, and determine that the IKE_Auth Initiator Request message includes a PDN address of the UE 330, the PDN address being used by the UE 330 in the WLAN 300-1 for making a voice call through the WLAN 300-1.

The handover processing unit 830 is used to perform voice call handover from WLAN 300-1 to WLAN 300-2, with the PDN address of the UE 330. In details, the handover processing unit 830 will notify PDN GW the PDN address of the UE 330 to inform the PDN GW that UE 330 moves into WALN 300-2's coverage. PDN GW will acknowledge the UE 330's handover and will assign a new PDN address to the UE 330 (the new PDN address can be different from or identical to the PDN address of UE 330 obtained in the WLAN 300-1). PDN GW then sends the new PDN address of the UE 330 to the handover processing unit 830 and begins to route data of the on-going voice call addressed to UE 330 to ePDG 800.

The PDN address detecting unit 820 can receive the IKE_Auth Initiator Request message from UE 330. For example, UE 330 will include the PDN address and/or the PDN type in the IKE_Auth Initiator Request message.

The PDN address detecting unit 820 can also determine that the IKE_Auth Initiator Request message does not include a PDN address of the UE. In this case, the session creating unit 835 performs a legacy Session Create procedure for the UE 330 without inter-WLAN voice call handover for the UE 330.

According to PDN GW's acknowledgement, the handover processing unit 830 sends to the UE 330 a response message (e.g., IKE_Auth Responser Response message) indicating the UE 330 is successfully connected to WLAN 300-2 and including a new PDN address assigned to the UE 330 and then sends data of the voice call to the UE 330 through WLAN 300-2 with the new PDN address. In this case, the new PDN address is different from or identical to the PDN address of UE 330 obtained in WLAN 300-1.

Processor Embodiments

Figure 9:
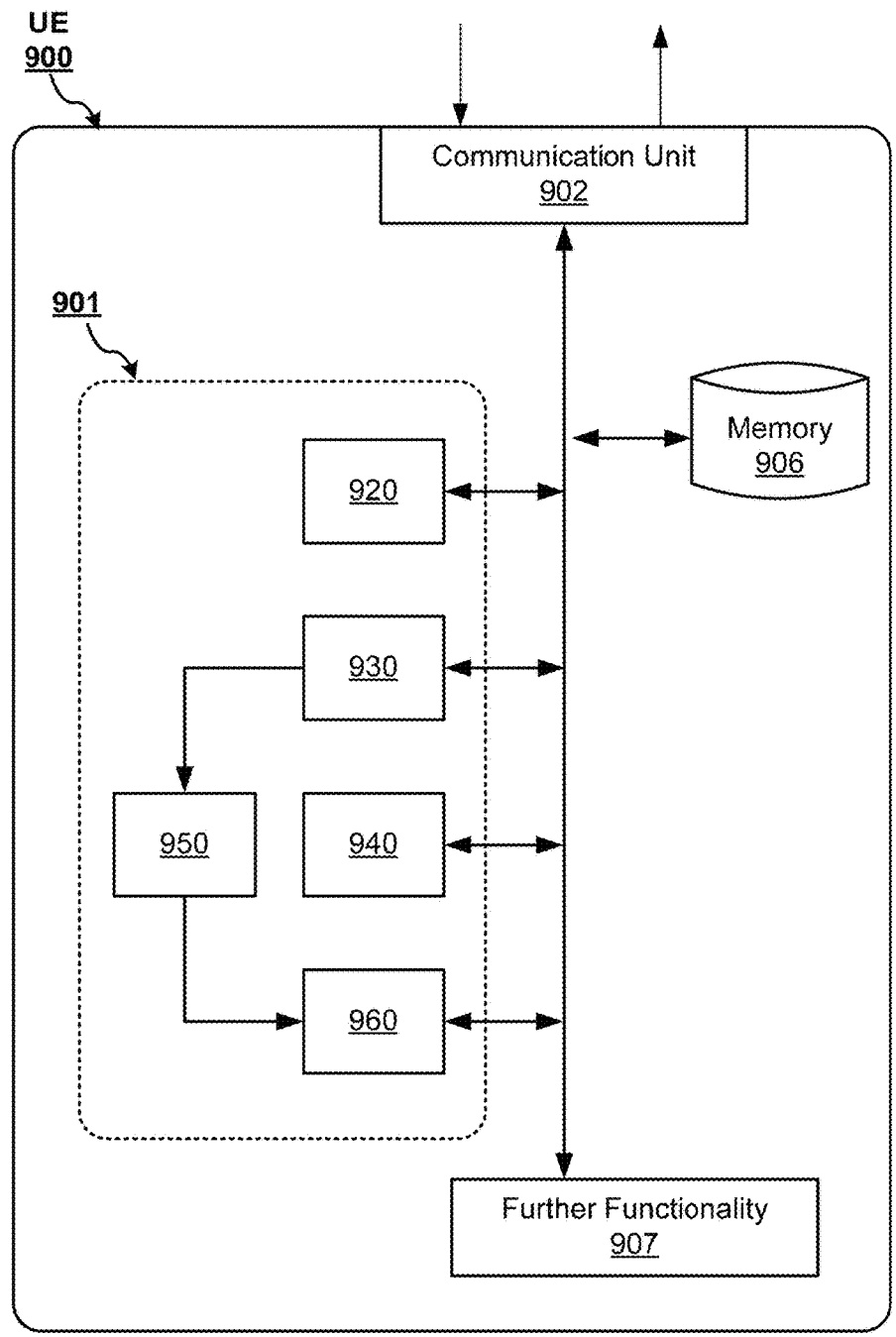
FIG. 9 is a schematic block diagram of UE 900 according to some embodiments of the present disclosure.

FIG. 9 is a schematic block diagram of UE 900 according to some embodiments of the present disclosure.

The part of UE 900 which is most affected by the adaptation to the herein described method is illustrated as an arrangement 901, surrounded by a dotted line. The UE 900 could be configured to be operable, e.g. in both LTE and WLAN systems or only in a WLAN system. The UE 900 and arrangement 901 are further configured to communicate with other entities via a communication unit 902 which may be regarded as part of the arrangement 901. The communication unit 602 comprises means for wireless communication such as one or more receivers, transmitters and/or transceivers. The arrangement 901 or UE 900 may further comprise other functional units 907, such as functional units providing regular UE functions, and may further comprise one or more storage units 906.

The arrangement 901 could be implemented, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 2 and/or FIG. 4. Thus, UE 900 may act as UE 130 in FIG. 1 and/or UE 330 in FIG. 3.

In scenario of FIG. 2, Block 920 can act as a call processing unit adapted to make a voice call through a WLAN under whose coverage the UE is located, with a PDN address obtained from a PDN to which the WLAN is connected (Step S2120). Block 930 can act as a signal detecting unit adapted to determine that a signal quality of the WLAN is not suitable for the voice call any more (Step S2130). Block 960 can act as a message sending unit configured to send the PDN address to a base station of a mobile communication network covering the UE (Step S2160), for facilitating a core network node of the mobile communication network to perform voice call handover from WLAN to the mobile communication network. Optionally, Block 940 can act as a network connecting unit adapt to, before the message sending unit sends the PDN address to the base station, initiate a Radio Resource Control (RRC) connection procedure with the base station in response to determining that the UE has no RRC connection with the base station (Step S2140, S2150). Optionally, Block 950 can act as a PDN address sending timer adapted to be started after the signal detecting unit determines the signal quality of the WLAN is not suitable for the voice call any more (S2135), and the message sending unit is further adapted to send the PDN address to the base station one or more times before the PDN address sending timer expires (S2185, S2160) and/or to send a message not containing the PDN address to the base station after the PDN address sending timer expires (S2185, S2190). Optionally, the call processing unit is adapted to receive, from the base station, a response message indicating the UE is successfully attached to the mobile communication network and including a new PDN address assigned to the UE, and continue the voice call through the mobile communication network with the new PDN address (S2170).

In scenario of FIG. 4, Block 920 can act as a call processing unit adapted to make a voice call through a WLAN under whose coverage the UE is located, with a PDN address obtained from a PDN to which the WLAN is connected (Step S4120). Block 930 can act as a signal detecting unit adapted to determine that a signal quality of the WLAN is not suitable for the voice call any more (Step S4130). Block 940 can act as a network connecting unit adapted to initiate a connection procedure to an AP of another WLAN in response to determining that the other WLAN is available (Step S4140, S4150). Block 960 can act as a message sending unit configured to send the PDN address to an ePDG of the other WLAN via the AP (Step S4160) for facilitating the ePDG of the other WLAN to perform inter-WLAN voice call handover. Optionally, Block 950 can act as a PDN address sending timer adapted to be started after the signal detecting unit determines the signal quality of the WLAN is not suitable for the voice call any more (S4135), and the message sending unit is further adapted to send the PDN address to the ePDG one or more times before the PDN address sending timer expires (S4185, S4160) and/or to send a message not containing the PDN address to the ePDG after the PDN address sending timer expires (S4185, S4190). The call processing unit is adapted to receive, from the ePDG, a response message indicating the UE is successfully connected to the other WLAN and including a new PDN address assigned to the UE, and continue the voice call through the other WLAN with the new PDN address (S4170).

Other similar operations may be referred to those detailed contents described in conjunction with FIGS. 1-4 and are thus omitted here for simplicity.

Computer Program Product Embodiments

Figure 10:
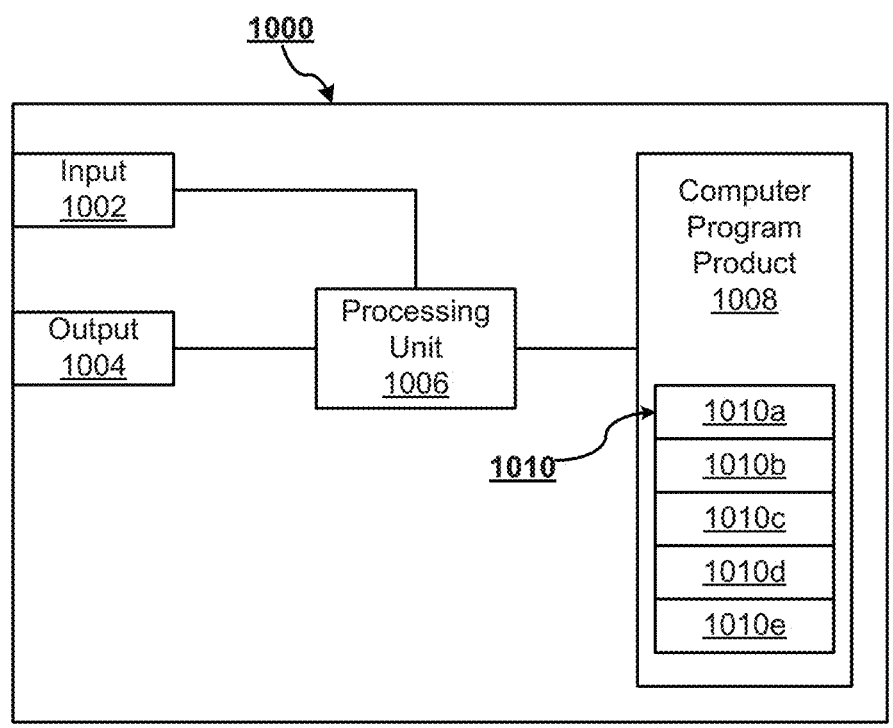
FIG. 10 schematically shows an embodiment of an arrangement 1000 which may be used in a UE 130/330.

FIG. 10 schematically shows an embodiment of an arrangement 1000 which may be used in a UE 130/330. Comprised in the arrangement 1000 are here a processing unit 1006, e.g., with a Digital Signal Processor (DSP). The processing unit 906 may be a single unit or a plurality of units to perform different actions of procedures described herein. The arrangement 1000 may also comprise an input unit 1002 for receiving signals from other entities, and an output unit 1004 for providing signal(s) to other entities. The input unit and the output unit may be arranged as an integrated entity or as illustrated in the example of FIG. 10.

Furthermore, the arrangement 1000 comprises at least one computer program product 1008 in the form of a non-volatile or volatile memory, e.g., an Electrically Erasable Programmable Read-Only Memory (EEPROM), a flash memory and a hard drive. The computer program product 1008 comprises a computer program 1010, which comprises code/computer readable instructions, which when executed by the processing unit 1006 in the arrangement 1000 causes the arrangement 1000 and/or the UE in which it is comprised to perform the actions, e.g., of the procedure described earlier in conjunction with FIG. 2 and/or FIG. 4.

The computer program 1010 may be configured as a computer program code structured in computer program modules 1010a-1010e.

Hence, in exemplifying embodiments corresponding to FIG. 2, the code in the computer program 1010 of the arrangement 1000 comprises a call processing module 1010a for making a voice call through a WLAN under whose coverage the UE is located, with a PDN address obtained from a PDN to which the WLAN is connected; a signal detecting module 1010b for determining that a signal quality of the WLAN is not suitable for the voice call any more; a message sending module 1010d for sending the PDN address to a base station of a mobile communication network covering the UE, for facilitating a core network node of the mobile communication network to perform voice call handover from WLAN to the mobile communication network. The code in the computer program 1010 of the arrangement 1000 may optionally comprise a network connecting module 1010c for, before the message sending module 1010d causes the PDN address to be sent to the base station, initiating a RRC connection procedure with the base station in response to determining that the UE has no RRC connection with the base station. The code in the computer program 1010 of the arrangement 1000 may optionally comprise a PDN address sending timer module 1010e for starting a timer after the signal detecting module 1010b determines the signal quality of the WLAN is not suitable for the voice call any more, and the message sending module 1010d causes the PDN address to be sent to the base station one or more times before the timer expires and/or causes a message not containing the PDN address to be sent to the base station after the timer expires. Optionally, the call processing module 1010a is also for receiving, from the base station, a response message indicating the UE is successfully attached to the mobile communication network and including a new PDN address assigned to the UE, and continuing the voice call through the mobile communication network with the new PDN address. The computer program modules could essentially perform the actions of the flow illustrated in FIG. 2, to emulate the arrangement 901 in the UE 900. In other words, when the different computer program modules are executed in the processing unit 1006, they may correspond, e.g., to the units 920-950 of FIG. 9.

Hence, in exemplifying embodiments corresponding to FIG. 4, the code in the computer program 1010 of the arrangement 1000 comprises a call processing module 1010a for making a voice call through a WLAN under whose coverage the UE is located, with a PDN address obtained from a PDN to which the WLAN is connected; a signal detecting module 1010b for determining that a signal quality of the WLAN is not suitable for the voice call any more; a network connecting module 1010c for a connection procedure to an AP of another WLAN in response to determining that the other WLAN is available; and a message sending module 1010d for sending the PDN address to an ePDG of the other WLAN via the AP for facilitating the ePDG of the other WLAN to perform inter-WLAN voice call handover. The code in the computer program 1010 of the arrangement 1000 may optionally comprise a PDN address sending timer module 1010e for starting a timer after the signal detecting module 1010b determines the signal quality of the WLAN is not suitable for the voice call any more, and the message sending module 1010d causes the PDN address to be sent to the ePDG one or more times before the timer expires and/or causes a message not containing the PDN address to be sent to the ePDG after the timer expires. Optionally, the call processing module 1010a is also for receiving, from the ePDG, a response message indicating the UE is successfully connected to the other WLAN and including a new PDN address assigned to the UE, and continuing the voice call through the other WLAN with the new PDN address. The computer program modules could essentially perform the actions of the flow illustrated in FIG. 4, to emulate the arrangement 901 in the UE 900. In other words, when the different computer program modules are executed in the processing unit 1006, they may correspond, e.g., to the units 920-950 of FIG. 9.

Other similar operations may be referred to those detailed contents described in conjunction with FIGS. 1-4 and are thus omitted here for simplicity.

Although the code means in the embodiments disclosed above in conjunction with FIG. 10 are implemented as computer program modules which when executed in the processing unit causes the device to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored.

For example, the computer program product may be a flash memory, a Random-access memory (RAM), a Read-Only Memory (ROM), or an EEPROM, and the computer program modules described above could in alternative embodiments be distributed on different computer program products in the form of memories within the UE.

In an embodiment of the present disclosure, there is provided a computer-readable storage medium (e.g., computer program product 1008) storing instructions that when executed, cause one or more computing devices to perform the method according to the present disclosure.

Although the present technology has been described above with reference to specific embodiments, it is not intended to be limited to the specific form set forth herein. For example, the embodiments presented herein are not limited to the existing WLAN/LTE configuration; rather they are equally applicable to new WLAN/LTE configurations defined in future. The technology is limited only by the accompanying claims and other embodiments than the specific above are equally possible within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

What is claimed is:

1. A method used in a User Equipment (UE) for facilitating voice call handover from a Wireless Local Area Network (WLAN) to a mobile communication network through a core network, the method comprising:
   making a voice call through the WLAN under whose coverage the UE is located, with a Packet Data Network (PDN) address obtained from the core network to which the WLAN is connected, wherein the PDN address includes an Internet Protocol (IP) address assigned to the UE;
   determining, by the UE, that a signal quality of the WLAN is not suitable for the voice call due to at least one of the following:
      a Bit Error Rate (BER) of signals of the WLAN is lower than a first predetermined threshold,
      data of the voice call are not received from the WLAN for a predetermined period, and
      a Received Signal Strength Indication (RSSI) of signals of the WLAN is lower than a second predetermined threshold;
   responsive to the determination, sending, by the UE, the PDN address to a base station of the mobile communication network covering the UE, wherein the PDN address, contained in an attach request message, is received by a serving general packet radio service (GPRS) support node (SGSN) in the mobile communication network; and
   receiving, from the base station, a response message indicating that the UE is successfully attached to the mobile communication network, the response message contains a new PDN address, including a new IP address assigned to the UE, wherein the UE continues the voice call using the new PDN address.

2. The method according to claim 1, wherein a PDN type is sent to the base station together with the PDN address.

3. The method according to claim 1, before sending the PDN address to the base station, the method further comprising:
   determining that the UE has no Radio Resource Control (RRC) connection with the base station; and
   initiating a RRC connection procedure with the base station in response to the determination that the UE has no RRC connection with the base station.

4. The method according to claim 1, after determining the signal quality of the WLAN is not suitable for the voice call anymore, the method further comprising:
   starting a PDN address sending timer, and
   wherein before the PDN address sending timer expires, the PDN address is sent to the base station one or more times.

5. The method according to claim 4, further comprising:
   after the PDN address sending timer expires, sending a message not containing the PDN address to the base station.

6. The method according to claim 1, wherein the response message is an Attach Accept message originating from the SGSN.

7. A User Equipment (UE) for facilitating voice call handover from a Wireless Local Area Network (WLAN) to a mobile communication network through a core network, the UE comprising:
   a transceiver configured to perform communications with a WLAN; and
   a processor configured to
      make a voice call through a WLAN under whose coverage the UE is located, with a Packet Data Network (PDN) address obtained from the core network to which the WLAN is connected, wherein the PDN address includes an Internet Protocol (IP) address assigned to the UE,
      determine that a signal quality of the WLAN is not suitable for the voice call anymore due to at least one of the following:
         a Bit Error Rate (BER) of signals of the WLAN is lower than a first predetermined threshold,
         data of the voice call are not received from the WLAN for a predetermined period, and
         a Received Signal Strength Indication (RSSI) of signals of the WLAN is lower than a second predetermined threshold,
      responsive to the determination, send the PDN address to a base station of the mobile communication network covering the UE, wherein the PDN address, contained in an attach request message, is received by a serving general packet radio service (GPRS) support node (SGSN) in the mobile communication network, and receive, from the base station, a response message indicating that the UE is successfully attached to the mobile communication network, the response message contains a new PDN address, including a new IP address assigned to the UE, wherein the UE continues the voice call using the new PDN address.

8. The UE according to claim 7, wherein the processor is further configured to send a PDN type to the base station together with the PDN address.

9. The UE according to claim 7, wherein the processor is further configured to:
before sending the PDN address to the base station, determine that the UE has no Radio Resource Control (RRC) connection, and initiate a RRC connection procedure with the base station in response to the determination that the UE has no RRC connection with the base station.

10. The UE according to claim 7, wherein the processor is further configured to:
start a PDN address sending timer after a determination that the signal quality of the WLAN is not suitable for the voice call anymore, and
send the PDN address to the base station one or more times before the PDN address sending timer expires.

11. The UE according to claim 10, wherein the processor is further configured to send a message not containing the PDN address to the base station after the PDN address sending timer expires.

12. The UE according to claim 7, wherein the response message is an Attach Accept message originating from the SGSN.

13. A non-transitory computer-readable storage medium storing instructions thereon, the instructions when executed, causing one or more computing devices to perform:
making a voice call by a User Equipment (UE) through a Wireless Local Area Network (WLAN) under whose coverage the UE is located, with a Packet Data Network (PDN) address obtained from a core network to which the WLAN is connected, wherein the PDN address includes an Internet Protocol (IP) address assigned to the UE;
determining, by the UE, that a signal quality of the WLAN is not suitable for the voice call due to at least one of the following:
a Bit Error Rate (BER) of signals of the WLAN is lower than a first predetermined threshold,
data of the voice call are not received from the WLAN for a predetermined period, and
a Received Signal Strength Indication (RSSI) of signals of the WLAN is lower than a second predetermined threshold; and
responsive to the determination, sending, by the UE, the PDN address to a base station of a mobile communication network covering the UE, wherein the PDN address, contained in an attach request message, is received by a serving general packet radio service (GPRS) support node (SGSN) in the mobile communication network; and
receiving, from the base station, a response message indicating that the UE is successfully attached to the mobile communication network, the response message contains a new PDN address, including a new IP address assigned to the UE, wherein the UE continues the voice call using the new PDN address.

14. A method used in a User Equipment (UE) for facilitating inter-WLAN voice call handover, the method comprising:
making a voice call through a first Wireless Local Area Network (WLAN) under whose coverage the UE is located, with a Packet Data Network (PDN) address obtained from a core network to which the WLAN is connected, wherein the PDN address includes an Internet Protocol (IP) address assigned to the UE;
determining, by the UE, that a signal quality of the first WLAN is not suitable for the voice call due to at least one of the following:
a Bit Error Rate (BER) of signals of the first WLAN is lower than a first predetermined threshold,
data of the voice call are not received from the first WLAN for a predetermined period, and
a Received Signal Strength Indication (RSSI) of signals of the first WLAN is lower than a second predetermined threshold;
determining that a second WLAN is available;
initiating a connection procedure to an Access Point (AP) of the second WLAN in response to the determination that the second WLAN is available;
sending, by the UE, the PDN address to an evolved Packet Data Gateway (ePDG) of the second WLAN via the AP; and
receiving, by the UE, a new PDN address from the ePDG, wherein the new PDN address includes a new IP address, and wherein the UE continues the voice call using the new PDN address.

15. A User Equipment (UE) for facilitating inter-WLAN voice call handover, the UE comprising:
a transceiver configured to perform communications with a first Wireless Local Network (WLAN); and
a processor configured to
make a voice call through a first WLAN under whose coverage the UE is located, with a Packet Data Network (PDN) address obtained from a core network to which the WLAN is connected, wherein the PDN address includes an Internet Protocol (IP) address assigned to the UE,
determine that a signal quality of the first WLAN is not suitable for the voice call due to at least one of the following:
a Bit Error Rate (BER) of signals of the first WLAN is lower than a first predetermined threshold,
data of the voice call are not received from the first WLAN for a predetermined period, and
a Received Signal Strength Indication (RSSI) of signals of the first WLAN is lower than a second predetermined threshold,
determine that a second WLAN is available,
initiate a connection procedure to an Access Point (AP) of the second WLAN in response to the determination that the second WLAN is available,
send the PDN address to an evolved Packet Data Gateway (ePDG) of the second WLAN via the AP, and
receive a new PDN address from the ePDG, wherein the new PDN address includes a new IP address assigned to the UE, and wherein the UE continues the voice call using the new PDN address.

16. A non-transitory computer-readable storage medium storing instructions thereon, the instructions when executed, causing one or more computing devices to perform:
making a voice call by a User Equipment (UE) through a first Wireless Local Area Network (WLAN) under whose coverage the UE is located, with a Packet Data Network (PDN) address obtained from a core network to which the WLAN is connected, wherein the PDN address includes an Internet Protocol (IP) address assigned to the UE;

determining, by the UE, that a signal quality of the first WLAN is not suitable for the voice call due to at least one of the following:
  a Bit Error Rate (BER) of signals of the first WLAN is lower than a first predetermined threshold,
  data of the voice call are not received from the first WLAN for a predetermined period, and
  a Received Signal Strength Indication (RSSI) of signals of the first WLAN is lower than a second predetermined threshold;

determining that a second WLAN is available;

initiating a connection procedure to an Access Point (AP) of the second WLAN in response to the determination that the second WLAN is available; and sending, by the UE, the PDN address to an evolved Packet Data Gateway (ePDG) of the second WLAN via the AP; and receiving, by the UE, a new PDN address from the ePDG, wherein the new PDN address includes a new IP address assigned to the UE, and wherein the UE continues the voice call using the new PDN address.

* * * * *